C. NELSON.
COFFEE MACHINE.
APPLICATION FILED APR. 24, 1907.
1,057,764.
Patented Apr. 1, 1913.
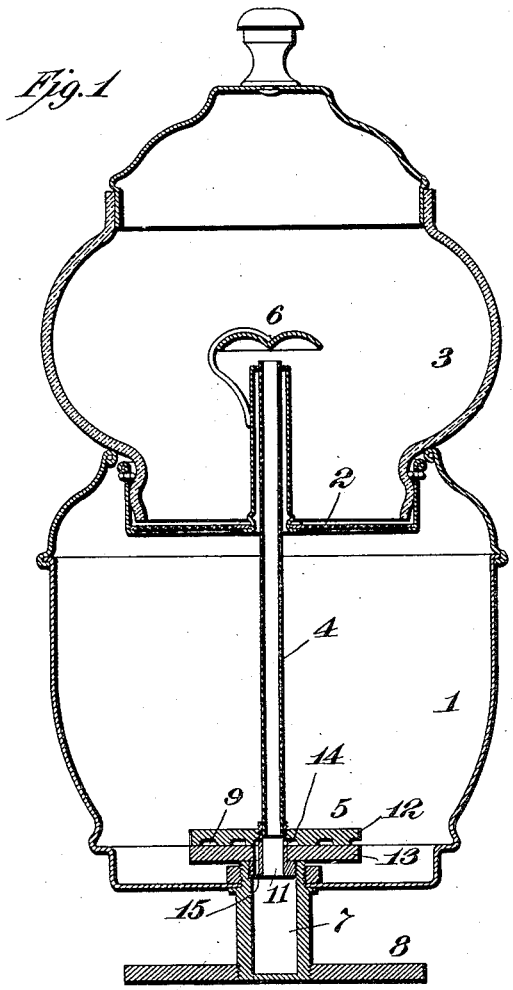
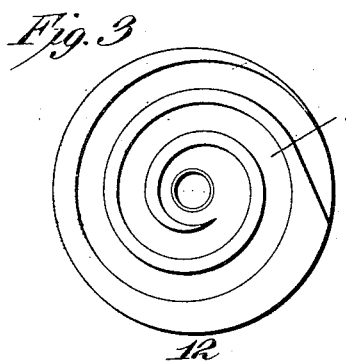
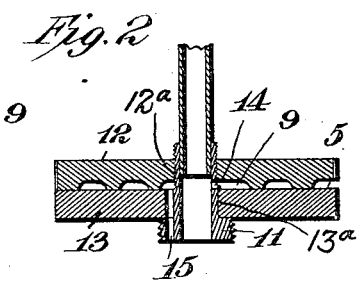
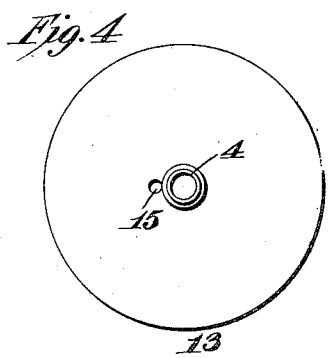
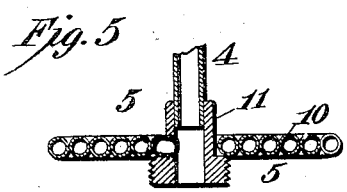
Witnesses:
Jas. F. Coleman
John Hotch
Inventor
Charles Nelson
By Dyer & Dyer
Attorneys.

UNITED STATES PATENT OFFICE.

CHARLES NELSON, OF BROOKLYN, NEW YORK, ASSIGNOR TO S. STERNAU & CO., OF NEW YORK, N. Y., A COPARTNERSHIP COMPOSED OF SIGMUND STERNAU AND LIONEL STRASSBURGER, OF NEW YORK, N. Y.

COFFEE-MACHINE.

1,057,764.  Specification of Letters Patent.  Patented Apr. 1, 1913.

Application filed April 24, 1907. Serial No. 369,921.

*To all whom it may concern:*

Be it known that I, CHARLES NELSON, a subject of the King of Sweden, residing in the borough of Brooklyn, county of Kings, and State of New York, have invented an Improvement in Coffee-Machines, (Case A,) of which the following is a specification.

The object I have in view is the production of a machine for making coffee or an infusion from coffee, tea and other materials for the production of a beverage or for other analogous purposes, which machine will have advantages over others heretofore produced.

The particular advantages I seek to secure are to produce a machine which will cause a percolating action in a very short time after heat has been applied and before the water in the receptacle has been raised appreciably in temperature.

Other objects lie in producing a device which may be readily cleaned, which will have no loose parts or valves, and will be cheap to manufacture.

I attain these objects by the mechanism illustrated in the accompanying drawings.

Figure 1 is a section of a portion of a coffee machine showing one embodiment of the invention. Fig. 2 is an enlarged sectional view of the percolator shown in Fig. 1. Fig. 3 is a bottom view of the upper plate of the percolator. Fig. 4 is a top view of the lower plate of the same, and Fig. 5 is a sectional view of a modification.

In all of the views like parts are designated by the same reference characters.

In carrying out my invention I provide the usual receptacle 1 for containing the water and infusion after such is made; a screen 2 for containing the substance of which the infusion is made; and a globe 3, above the screen. The screen 2 has a central opening, through which the tube 4 of the percolator 5 passes. The tube 4 extends a sufficient distance above the screen 2 so that the liquid (water and essence after the latter is formed) will strike against the deflector 6, and be splattered outward and sprinkled downward upon the contents of the screen, soaking through the latter and producing the infusion.

The tube 4 is vertical and its lower end is open and communicates with a chamber 7. This chamber is cylindrical in construction, has an open top and extends below the bottom of the receptacle 1, and its lower edge is provided with a plate 8, for convecting the heat of the lamp against the walls of the chamber 7, thus concentrating the heat about the chamber and for keeping the bottom of the receptacle cool. The top of the chamber 7 is closed by the percolator 5. The body of the chamber communicates with the receptacle 1 by means of a passage 9 formed in a portion of the percolator. This passage is in the form of a spiral. This spiral passage is not necessarily made in the percolator; it may be made of a tube 10, as shown in Fig. 5, such tube being spirally coiled around the bore of the tube 4. In this construction the bottom of the tube 4 engages with a tubular fitting 11, forming the bottom of the percolator; this fitting is tightly connected, such as by being screwed into the top of the chamber 7 so that no liquid can enter or leave the chamber at the joint. One end of the tube 10 communicates with this fitting, the other end is open. The spiral coil is formed upon substantially a horizontal plane so that the free and open end of the tube 10 will be as near the bottom of the receptacle 1 as is possible. In the other figures of the drawing the passage 9 is formed by means of the plates 12 and 13. The passage is preferably cut out of one of the plates, thus forming the sides and bottom or top wall of the passage, the other plate forming the fourth wall. The reasons for this arrangement will appear later.

As shown in Fig. 2, the plate 13 is permanently secured to the tubular fitting 11, through a central opening 13ᵃ. The plate 12, (in the embodiment chosen for illustration) has the spiral groove and is removably secured to the tubular fitting, such fitting having screw threads formed upon it, with which the central opening 12ᵃ of the plate 12 engages. The periphery of the plate 12 is milled, as is shown in Fig. 2. By screwing the plate 12 so that it comes in close engagement with the plate 13, an inclosed spiral passage is formed between the two plates, such passage being open at its periphery to communicate with the interior of the receptacle 1 and also open at its inner end to communicate with the passage or opening 14 formed in the tubular fitting 11, thereby communicating with the center of such fitting and with the chamber 7. By separating the plates 12 and 13 the interior of the passage 9 may be readily cleansed. By having the groove entirely in one plate instead of in both, the difficulty of having the two parts of the groove fail to register by the wearing of the faces of the plates or the wearing of the threads on the tubular fitting in the central opening of the plate 12, is avoided. In addition to the opening 14, which is made transversely through the side walls of the tubular fitting 11, an additional opening 15 may be employed. This is for the purpose of securing an increased cross section of the opening. One or the other of the openings 14 and 15 may be used or employed if desired when one alone is found to be inadequate.

The operation is as follows: The receptacle 1 being partly filled with water and the substance of which it is desired to secure the essence being placed within the screen 2, the plate 8 and bottom of the chamber 7 are heated, preferably by the usual spirit lamp. The chamber 7 will be filled with water which will enter through the passage 9. The chamber 7 being of relatively small capacity and the plate 8 convecting and concentrating the heat to the chamber, and at the same time preventing heat from reaching the receptacle, the water within the chamber will become immediately heated and a portion of it converted into steam. As the steam expands it will drive the water therein and in the tube 4 upward and divert it against the deflector 6, and will spray it over the material in the screen 2, which will form the essence, which will flow back into the receptacle 1. The spiral passage 9 offers a resistance to the liquid to leave the chamber 7, which is greater than the resistance offered by the straight tube 4; consequently, there being less resistance in the tube 4 than in the spiral passage 9, the greater portion of the liquid will be driven up through the tube 4. After this ebullition the liquid in the tube 4 will rise again to its normal level, which will be the level of the liquid within the receptacle 1, or slightly above the same, caused by the capillary effect in the tube 4, and fresh liquid will enter the chamber 7 through the spiral passage. The operation will be repeated as soon as the contents of the chamber 7 can become sufficiently hot to cause the expansion and the driving upward of the liquid in the tube 4. I have found that in practice, having cold water and a spirit lamp, the liquid will be raised in the tube 4 against the deflector 6 in somewhat less than a minute and a quarter.

By my construction, a simple, cheap and effective device is produced, which has no moving parts and which may be readily cleansed.

I have described my invention in connection with a coffee machine in which heat is applied by means of a lamp, but it is to be understood that the invention may be applied to any other form of coffee machine, such as one for use with an ordinary stove, in which form the device will be similar to a coffee pot.

The broad feature of the invention consisting of a spiral or labyrinthine passage between the heating chamber and the receptacle is not claimed herein, but forms the subject-matter of other co-pending applications.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now particularly described the nature of my invention, and in what manner the same is to be performed, what I claim and desire to secure by Letters Patent is:

1. A coffee machine having a receptacle and an open-ended chamber, a percolator tube removably connected with the chamber, the said tube carrying an enlargement, said enlargement lying in the receptacle, said enlargement being provided with an inclosed, open-ended, spiral passage, one extremity thereof communicating with the receptacle and the other extremity communicating with the chamber.

2. A coffee machine, having a heating chamber, a percolator comprising a tube, a disk secured to the tube, there being a perforation through the disk, in line with the tube, a second disk secured to the tube and in contact with the first disk, and having a perforation in line with the tube, there being a spiral groove in the face of one of the disks, in juxtaposition to the other disk, the said groove extending from the periphery of the disk inward to the tube, and in communication with the heating chamber.

3. A coffee machine, having a heating chamber, a percolator comprising a tube, a disk secured to the tube, there being a perforation through the disk in line with the tube, a second disk, also having a perforation in line with the tube, there being a spiral groove in the face of one of the disks, and means for removably securing the second disk in contact with the first disk, to inclose the groove, and produce a passage from the peripheries of the disks inward to the tube, and in communication with the heating chamber.

4. A coffee machine having a receptacle and an open-ended heating chamber communicating therewith, a percolator tube removably connected to the chamber, said tube carrying an enlargement which lies within the receptacle, said enlargement being composed of two abutting members, one being permanently secured to the tube and the other removably secured thereto, and a spiral groove in one of said members, said groove extending from the periphery of the enlargement to the inside thereof, and communicating with the heating chamber.

5. A percolator for a coffee machine, which comprises a tube, a member permanently secured to the tube, a second member removably secured to the tube and abutting against the first member, one of the members having a spiral groove in its face, which abuts against the other member, such other member inclosing one side of the groove and forming thereby a closed spiral passage.

6. A coffee machine, comprising a main vessel, a heating chamber associated therewith and having an outlet part extending into said vessel, a percolating tube, a container for coffee, associated with said tube, there being within said vessel a member provided with spaced walls and having an inlet opening into the spaces between said walls, a second member associated with said tube and adapted to seat against said first member and engaging said walls, and means whereby said two members can be removably connected, the spaces between said walls constituting a passage through which fluid can pass from said vessel into said heating chamber.

7. A coffee machine, having a receptacle; a heating chamber extending below the receptacle; a vertical percolator tube, connected to and communicating with the chamber; a horizontal disk-like member, made of two abutting parts, and lying within the receptacle, and having a horizontal spiral passage open at its outer end within the receptacle, and delivering, at its inner end, the liquid to the heating chamber.

8. A coffee machine, having a receptacle; a heating chamber extending below the receptacle; a vertical percolator tube, connected to and communicating with the chamber; a horizontal disk-like member, made of two abutting parts, and lying within the receptacle, and having a horizontally spiral passage open at its outer end within the receptacle, and delivering, at its inner end, the liquid to the heating chamber, the passage being formed wholly within one of the members.

This specification signed and witnessed this 22nd day of April, 1907.

CHARLES NELSON.

Witnesses:
 JOHN L. LOTSCH,
 EDWARD IRMSCHER.